(12) United States Patent
Simonnet et al.

(10) Patent No.: US 12,549,000 B2
(45) Date of Patent: Feb. 10, 2026

(54) OVERVOLTAGES PROTECTION CIRCUIT

(71) Applicant: STMICROELECTRONICS INTERNATIONAL N.V., Geneva (CH)

(72) Inventors: Jean-Michel Simonnet, Veretz (FR); Romain Pichon, Reugny (FR)

(73) Assignee: STMicroelectronics International N.V., Geneva (CH)

( * ) Notice: Subject to any disclaimer, the term of this patent is extended or adjusted under 35 U.S.C. 154(b) by 53 days.

(21) Appl. No.: 18/606,918

(22) Filed: Mar. 15, 2024

(65) Prior Publication Data

US 2024/0332955 A1 Oct. 3, 2024

(30) Foreign Application Priority Data

Mar. 31, 2023 (FR) ...................................... 2303191

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC ...... H01M 4/366; H01M 4/364; H01M 4/525; H01M 4/62; H01M 10/0525; H01M 2004/021; H01M 2004/028; H01M 4/0471; H01M 4/1391; H01M 10/052; H01M 2220/20; H01M 4/505; Y02E 60/10; C01G 53/50; C01P 2004/82
USPC ......................................................... 361/91.1
See application file for complete search history.

(56) References Cited

U.S. PATENT DOCUMENTS

| | | | | |
|---|---|---|---|---|
| 4,153,858 | A * | 5/1979 | Schylander | H04N 9/29 361/150 |
| 6,226,166 | B1 * | 5/2001 | Gumley | H02H 9/06 361/111 |
| 11,362,083 | B2 * | 6/2022 | Ren | H02H 9/042 |
| 2003/0112575 | A1 * | 6/2003 | Knigge | H04M 3/18 361/119 |
| 2009/0273868 | A1 * | 11/2009 | Liu | H10D 8/25 361/56 |
| 2012/0176718 | A1 * | 7/2012 | Jorgensen | H02H 9/046 361/111 |
| 2013/0229055 | A1 * | 9/2013 | Trumbo | H02H 9/04 361/111 |
| 2017/0047733 | A1 * | 2/2017 | Buchanan | H02H 9/041 |
| 2018/0287486 | A1 * | 10/2018 | Peng | H02M 1/34 |
| 2019/0372333 | A1 * | 12/2019 | Böhm | H03K 17/08142 |

(Continued)

FOREIGN PATENT DOCUMENTS

DE 102020203242 A1 * 9/2021 ............ H02H 3/202
KR 102033678 B1 11/2019

*Primary Examiner* — Dharti H Patel
(74) *Attorney, Agent, or Firm* — Alston & Bird LLP

(57) ABSTRACT

The present description concerns a circuit of protection against overvoltages appearing during a protection against overcurrents comprising: a first diode and a second diode having their cathodes coupled to a first node; a first transient voltage suppressor diode having its cathode coupled to a second node and having its anode coupled to the anode of the first diode; a thyristor having its cathode coupled to the anode of the second diode, having its anode coupled to the second node, and having its gate coupled to the anode of the first diode; and a switch having a first terminal coupled to the first node.

16 Claims, 3 Drawing Sheets

(56) References Cited

U.S. PATENT DOCUMENTS

2020/0106267 A1* 4/2020 Pichon .................. H02H 9/005
2021/0249851 A1* 8/2021 Hackl ..................... H02H 3/023
2023/0155374 A1* 5/2023 Ikeda ..................... H02H 9/046
                                                            361/56
2024/0332955 A1* 10/2024 Simonnet ............. H02H 1/0007

* cited by examiner

OVERVOLTAGES PROTECTION CIRCUIT

CROSS REFERENCE TO RELATED APPLICATIONS

This application claims the priority benefit of French patent application number FR2303191, filed on Mar. 31, 2023, entitled "Circuit de protection contre les surtensions", which is hereby incorporated by reference to the maximum extent allowable by law.

TECHNICAL FIELD

The present disclosure generally concerns the field of power electronics, and more particularly concerns electronic devices and circuits adapted to overvoltage protection during the protection against overcurrents.

BACKGROUND

It is currently essential to equip electronic systems and devices with circuits of protection against overcurrents and against overvoltages. Indeed, the occurrence of an overcurrent or of an overvoltage may severely damage an unprotected system or device.

It would be desirable to be able to improve, at least partly, certain aspects of overvoltage protection circuits.

BRIEF SUMMARY

There exists a need for higher-performance circuits of protection against overcurrents and against overvoltages.

There exists a need for bidirectional circuits of protection against overcurrents and against overvoltages.

An embodiment overcomes all or part of the disadvantages of known circuits of protection against overvoltages and overcurrents.

An embodiment provides a circuit of protection against overvoltages occurring during a protection against overcurrents comprising:
- a first diode and a second diode having their cathodes coupled to a first node;
- a first transient voltage suppressor diode having its cathode coupled to a second node and having its anode coupled to the anode of said first diode;
- a thyristor having its cathode coupled to the anode of said second diode, having its anode coupled to said second node, and having its gate coupled to the anode of said first diode; and
- a switch having a first terminal coupled to the first node.

According to an embodiment, the first diode is a PN-junction diode.

According to an embodiment, the second diode is a Schottky diode.

According to an embodiment, the second diode is a PN-junction diode.

According to an embodiment, the first and second diodes have reverse bias voltages greater than a maximum power supply voltage.

According to an embodiment, the maximum power supply voltage is greater than 14 V.

According to an embodiment, the power supply voltage is adapted to being applied between a second terminal of the switch, different from the first terminal, and said second node.

According to an embodiment, said first transient voltage suppressor diode has an avalanche voltage greater than a voltage delivered by a load.

According to an embodiment, the circuit further comprises at least one second transient voltage suppressor diode arranged in series between the cathode of said first transient voltage suppressor diode and said second node.

According to an embodiment, the switch is one or a plurality of NMOS-type transistors.

According to an embodiment, the switch is one or a plurality of PMOS-type transistors.

According to an embodiment, a load is adapted to being connected between the first and second nodes.

According to an embodiment, said load is a battery.

According to an embodiment, the circuit further comprises:
- a third transient voltage suppressor diode having its cathode coupled to the first node; and
- a third diode having its anode coupled to the anode of said third transient voltage suppressor diode, and having its cathode coupled to the second node.

Another embodiment provides a voltage conversion device comprising the previously-described circuit.

Another embodiment provides a vehicle comprising a previously-described circuit.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
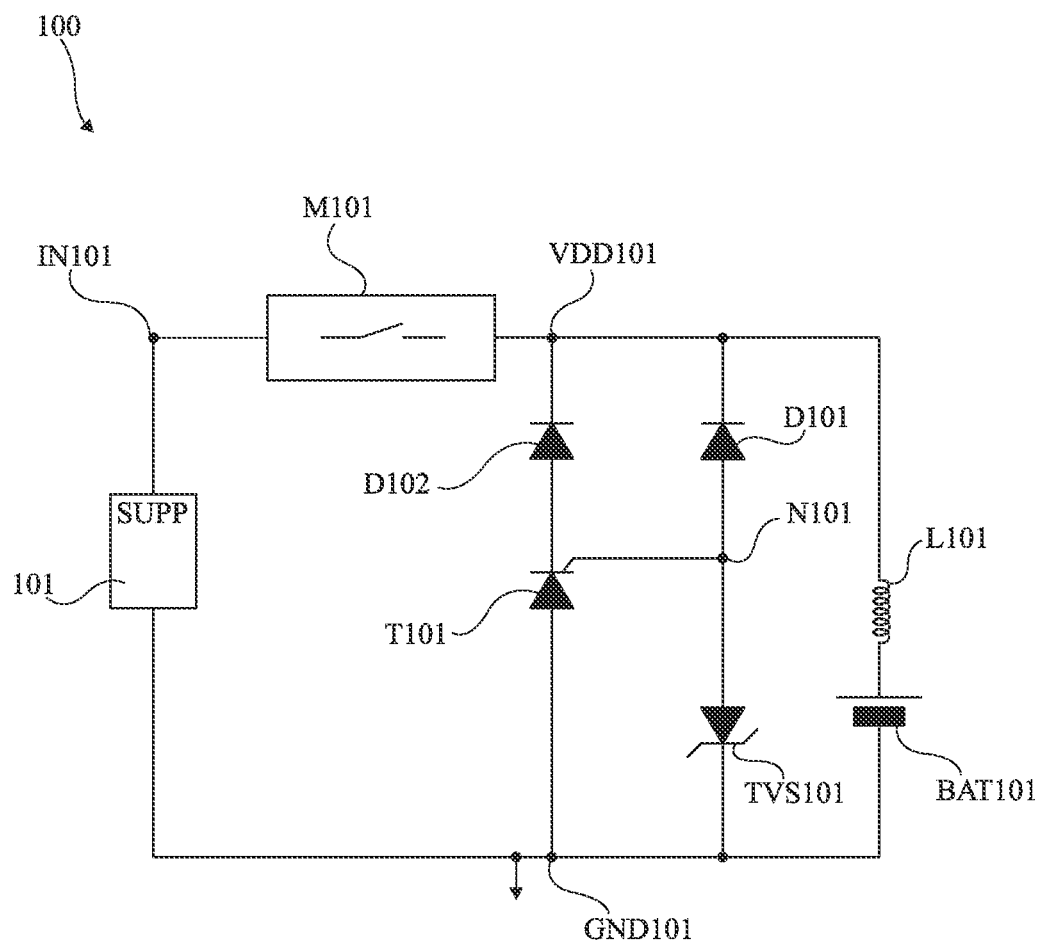
FIG. 1 shows a first embodiment of a circuit of protection against overcurrents and overvoltages.

FIG. 1 shows an embodiment of circuit 100 of protection against overcurrents and against overvoltages. More particularly, circuit 100 is a circuit of protection against overvoltages appearing during a protection against overcurrents.

Circuit 100 is adapted to being placed between a power supply 101 (SUPP) and a load. Power supply 101 delivers a power supply voltage between a node IN101 and a node GND101, and a power supply current on node IN101. According to an example, node GND101 is a reference node, that is, a node receiving a reference potential, such as the ground.

In FIG. 1, the load is a battery BAT101, and a parasitic inductance L101 is shown in series with battery BAT101. According to an example, parasitic inductance L101 represents the parasitic inductance of conductive wires coupling battery BAT101 to other electronic devices or components. Thus, inductance L101 and battery BAT101 are assembled in series between a node VDD101 and reference node GND101.

According to an example, battery BAT101 is a rechargeable battery, such as a motor vehicle battery. According to a preferred example, battery BAT101 is an auxiliary battery of a motor vehicle. According to an example, circuit 100 may form part of a voltage conversion device adapted to powering an auxiliary battery of a motor vehicle.

According to another example, the load may form part of a powertrain, of an induction cooker, of a photovoltaic panel, etc. More generally, circuit 100 may form part of any converter of a DC voltage into another DC voltage, and of a charger using a DC voltage capable of forming part of an electronic device pertaining to the list of previously-described systems.

Circuit 100 comprises a switch M101 of protection against short-circuits or overcurrents. According to an example, switch M101 is a transistor, or a plurality of transistors assembled in parallel. According to an embodiment, switch M101 is one or a plurality of insulated-gate field-effect transistors, or metal-oxide-semiconductor field-effect transistors, more currently called MOSFET transistors or MOS transistors. More particularly, and according to an example, transistor M101 is one or a plurality of N-channel MOS-type transistors, also called NMOS transistor. According to another example, transistor M101 is one or a plurality of P-channel MOS transistors, also called PMOS transistor.

A first conduction terminal of switch M101 is coupled, preferably connected, to node IN101, and a second conduction terminal of switch M101 is coupled, preferably connected, to node VDD101.

The circuit further comprises, between node VDD101 and node GND101, a diode D101 and a transient voltage suppressor diode TVS101.

The cathode of diode D101 is coupled, preferably connected, to node VDD101, and the anode of diode D101 is coupled, preferably connected, to a node N101. According to an example, diode D101 is a conventional PN-junction diode, that is, a diode formed in a semiconductor substrate. According to an embodiment, diode D101 has a reverse bias voltage, currently called voltage VRRM, greater than a maximum power supply voltage Vmax. According to an example, maximum power supply voltage Vmax is greater than 14 V, for example in the order of 24 V. According to a variant, diode D101 may be replaced with a plurality of other diode assembled in series.

Transient voltage suppressor diode TVS101 (TVS), called TVS diode TVS101, or Transil diode, hereafter, is represented in FIG. 1 by the same electronic symbol as a Zener diode. TVS diode TVS101 is adapted to withstanding between its terminals a voltage supplied by the load, here battery BAT101. Thus, TVS diode TVS101 has a clamping voltage greater than or equal to the voltage of battery BAT101. According to an embodiment, the clamping voltage of TVS diode TVS101 is greater than or equal to 14 V. The anode of TVS diode TVS101 is coupled, preferably connected, to node N101, and the cathode of TVS diode TVS101 is coupled, preferably connected, to node GND101.

According to an alternative embodiment, TVS diode TVS101 may be formed of a plurality of TVS diodes arranged in series, in the same direction, between nodes N101 and GND101.

The circuit further comprises, between node VDD101 and node GND101, a diode D102 and a thyristor T101

The cathode of diode D102 is coupled, preferably connected, to node VDD101. According to a first example, diode D102 is a conventional PN-junction diode, that is, a diode formed in a semiconductor substrate. According to a second example, diode D102 is a Schottky diode. According to an embodiment, diode D102 has a reverse bias voltage greater than the previously-described maximum power supply voltage Vmax.

Thyristor T101 is a silicon-controlled rectifier (SCR). The cathode of thyristor T101 is coupled, preferably connected, to the anode of diode D102, and the anode of thyristor T101 is coupled, preferably connected, to node GND101. The gate of thyristor T101 is coupled, preferably connected, to node N101.

Figure 2:
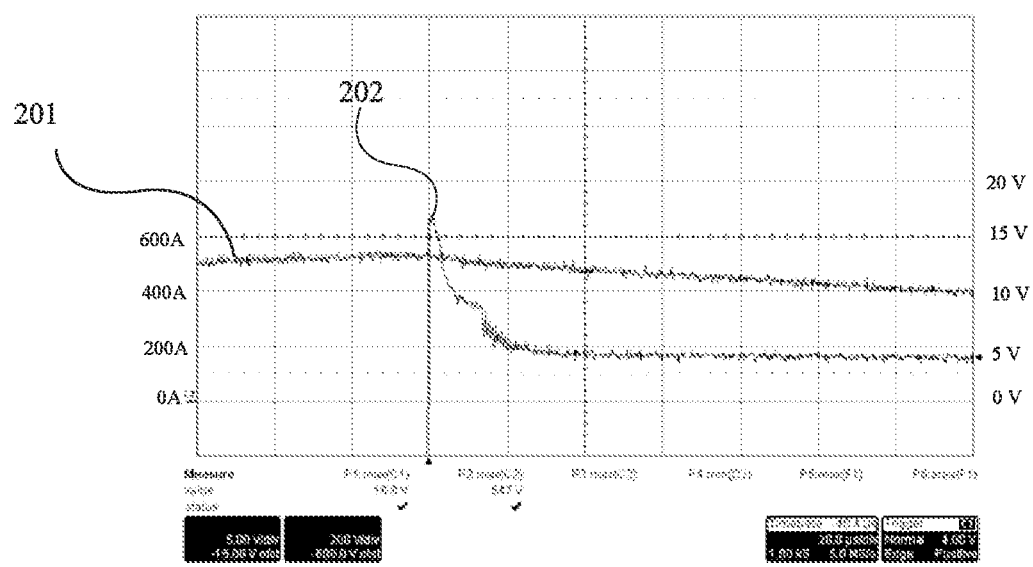
FIG. 2 shows a graph illustrating the operation of the embodiment of FIG. 1.

The operation of circuit 100 is described in relation with FIG. 2.

FIG. 2 is a graph showing two curves 201 and 202 illustrating the operation of the circuit 100 described in relation with FIG. 1.

More particularly, curve 202 is a timing diagram illustrating the variation of a voltage VDD taken between nodes GND101 and VDD101. Curve 201 is a timing diagram illustrating the variation of an overcurrent appearing at the input of battery BAT101, that is, at the level of node VDD101, via inductance L101.

The operation of circuit 100 is the following.

In a normal operating mode, power supply 101 delivers a power supply voltage and a power supply current to the load, that is, here battery BAT101. For this purpose, switch M101 is conductive, and diodes D101 and D102 are adapted to blocking a current originating from node VDD101. TVS diode TVS101 and thyristor T101 are not conductive.

If, by error, load BAT101 is assembled in reverse, the voltage of load BAT101 is blocked by TVS diode TVS101, which has an avalanche voltage greater than the voltage of battery BAT101. Thyristor T101 is still blocked, since no current is supplied to its gate. Battery BAT101 is thus not discharged by the overvoltage protection circuit.

On occurrence of a short-circuit or of an overcurrent, which is the case illustrated in FIG. 2, the current increases rapidly and switch M101 detects the short-circuit, or the overcurrent. Switch M101 becomes non-conductive. An overvoltage due to the sudden cut-off of the current through the cables coupling the battery, these cables having an inductance represented by coil L101, appears at the level of protection circuit 100, and more particularly at the level of TVS diode TVS101 and of diode D101. When this overvoltage is greater than the sum of the clamping voltage of TVS diode TVS101 and of the forward bias voltage of diode D101, a current flows through diode D101. When the voltage across diode D101 is sufficiently strong, that is, when the voltage across diode 101 is greater than the maximum voltage applicable between the gate and the cathode of thyristor T101 without turning it on, a current flows through the gate of thyristor T101 and arrives at the level of the cathode of thyristor T101 and of the anode of diode D102. Thyristor T101 is then turned on and conducts the overvoltage which is then taken to reference node GND101, and operates like a free wheel diode. The load is thus not powered.

An advantage of circuit 100 is that it allows a protection of the power supply circuits and of the circuits powered by battery BAT101 against possible overvoltages capable of occurring as a result of the occurrence of an overcurrent blocked by switch M101.

Figure 3:
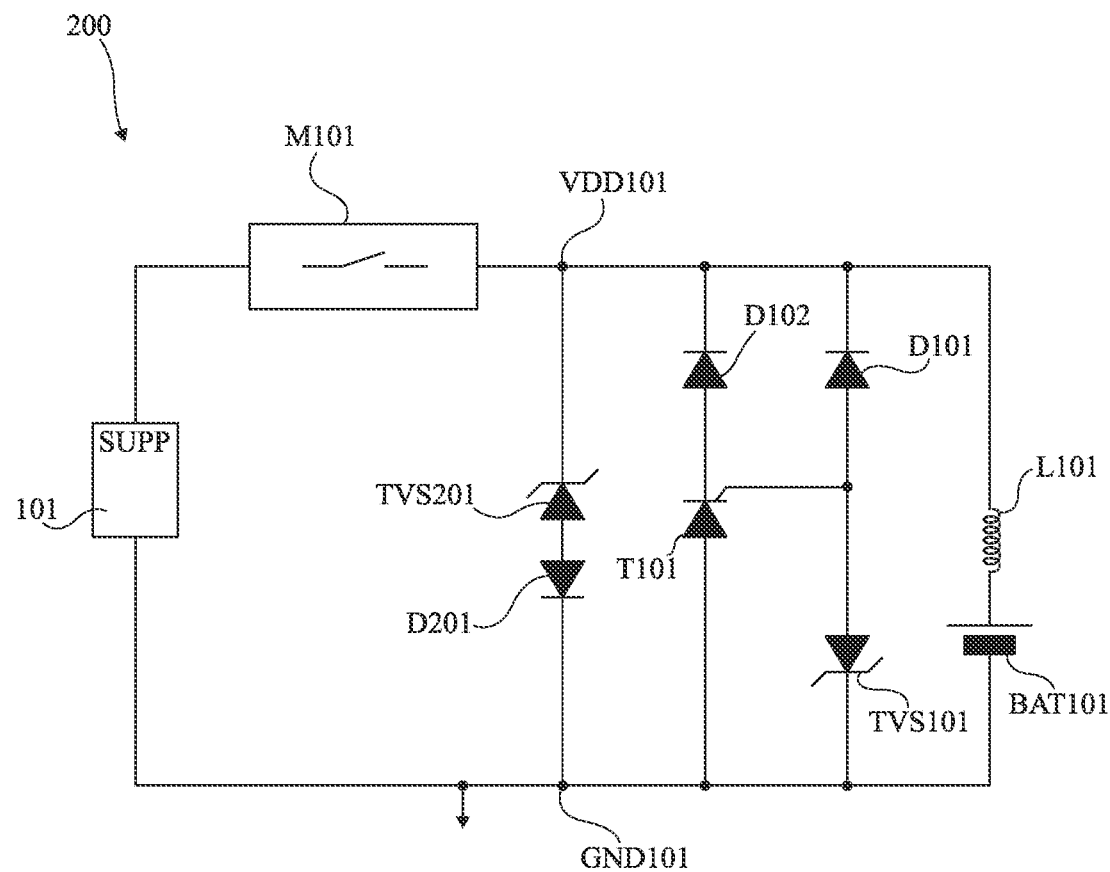
FIG. 3 shows a first embodiment of a circuit of protection against overcurrents and against overvoltages.

FIG. 3 shows an embodiment of a circuit of protection 200 against overcurrents and against overvoltages.

Protection circuit 200 is similar to the protection circuit 100 described in relation with FIG. 1. The elements common to circuits 100 and 200 are not described again in detail herein, and only the differences between circuits 100 and 200 are highlighted.

Thus, like circuit 100, circuit 200 is adapted to being placed between power supply 101 (SUPP) and a load. As in FIG. 1, in FIG. 2, the load is battery BAT101 along with a parasitic inductance L101.

Similarly, like circuit 100, circuit 200 comprises:
switch M101;
diode D101 and TVS diode TVS101; and
diode D102 and thyristor T101.

The circuit further comprises a TVS diode TVS201 and a diode D201. These two components aim at removing overvoltages likely to appear between nodes VDD101 and GND101. According to an example, diode D201 is adapted to having a reverse bias voltage greater than a limiting voltage Vlim defined by the circuits to be protected.

The cathode of TVS diode TVS201 is coupled, preferably connected, to node VDD101, and the anode of TVS diode TVS201 is coupled, preferably connected, to the anode of diode D201. The cathode D201 of diode D201 is coupled, preferably connected, to node GND101.

According to an embodiment, TVS diode TVS201 is adapted to damping positive overvoltages occurring between nodes VDD101 and GND101. According to an embodiment, diode D201 is adapted to blocking negative overvoltages occurring between nodes VDD101 and GND101. According to a variant, TVS diode TVS201 may be replaced with a plurality of series-assembled diodes.

An advantage of circuit 200 is that it allows a bidirectional protection of the load against overvoltages caused by a protection against overcurrents.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

The invention claimed is:

1. A circuit of protection against overvoltages appearing during a protection against overcurrents comprising:
a first diode and a second diode having their cathodes coupled to a first node;
a first transient voltage suppressor diode having its cathode coupled to a second node and having its anode coupled to an anode of the first diode;
a thyristor having its cathode coupled to the anode of the second diode, having its anode coupled to the second node, and having its gate coupled to the anode of the first diode; and
a switch having a first terminal coupled to the first node.

2. The circuit of claim 1, wherein the first diode is a PN-junction diode.

3. The circuit of claim 1, wherein the second diode is a Schottky diode.

4. The circuit of claim 1, wherein the second diode is a PN-junction diode.

5. The circuit of claim 1, wherein the first diode and the second diode have reverse bias voltages greater than a maximum power supply voltage.

6. The circuit of claim 5, wherein the maximum power supply voltage is greater than 14 V.

7. The circuit of claim 1, wherein a power supply voltage is adapted to being applied between a second terminal of the switch, different from the first terminal, and the second node.

8. The circuit of claim 1, wherein the first transient voltage suppressor diode has an avalanche voltage greater than a voltage delivered by a load.

9. The circuit of claim 1, further comprising at least one second transient voltage suppressor diode arranged in series between the cathode of the first transient voltage suppressor diode and the second node.

10. The circuit of claim 1, wherein the switch is one or a plurality of NMOS-type transistors.

11. The circuit of claim 1, wherein the switch is one or a plurality of PMOS-type transistors.

12. The circuit of claim 1, wherein a load is adapted to being connected between the first and second nodes.

13. The circuit of claim 12, wherein the load is a battery.

14. The circuit of claim 1, further comprising:
a third transient voltage suppressor diode having its cathode coupled to the first node; and
a third diode having its anode coupled to the anode of the third transient voltage suppressor diode, and having its cathode coupled to the second node.

15. A voltage conversion device comprising the circuit of to claim 1.

16. A vehicle comprising the circuit of claim 1.

* * * * *